United States Patent
Di Pietro et al.

[19]

[11] Patent Number: 5,854,751
[45] Date of Patent: Dec. 29, 1998

[54] SIMULATOR AND OPTIMIZER OF LASER CUTTING PROCESS

[75] Inventors: Paul Di Pietro, Fairy Meadow, Australia; Y. Lawrence Yao, New York, N.Y.

[73] Assignee: The Trustees of Columbia University in the City of New York, New York, N.Y.

[21] Appl. No.: 730,330

[22] Filed: Oct. 15, 1996

[51] Int. Cl.⁶ .................................................. G06F 19/00
[52] U.S. Cl. ............................... 364/474.08; 219/121.62; 219/121.64
[58] Field of Search ............... 364/167.01, 474.08, 364/477.01, 477.06, 167.07, 167.09; 219/121.62, 121.67, 121.72, 121.81, 121.83, 121.85, 121.64

[56] References Cited

U.S. PATENT DOCUMENTS

| | | | |
|---|---|---|---|
| 4,403,134 | 9/1983 | Klingel | 219/121.67 |
| 4,638,145 | 1/1987 | Sakuma et al. | 219/121.78 |
| 5,182,434 | 1/1993 | Nakata | 219/121.72 |
| 5,252,805 | 10/1993 | Nakata et al. | 219/121.72 |
| 5,552,575 | 9/1996 | Doumanidis | 219/121.64 |
| 5,586,714 | 12/1996 | Curicuta et al. | 219/121.64 |

OTHER PUBLICATIONS

P. Di Pietro and Y. L. Yao, "A New Technique to Characterize and Predict Laser Cut Striations," International Journal of Machine Tools for Manufacturing, vol. 35, No. 7, pp. 993–1002 (1995); and.

P. Di Pietro and Y. L. Yao, "A Numerical Investigation Into Cutting Front Mobility In $CO_2$ Laser Cutting," International Journal of Machine Tools for Manufacturing, vol. 35, No. 5, pp. 673–688 (1995).

*Primary Examiner*—Joseph Ruggiero
*Attorney, Agent, or Firm*—Baker & Botts, L.L.P.

[57] ABSTRACT

A system and method for stabilizing the cutting front temperature of a laser beam on a workpiece in order to improve the quality of the laser beam cut. The technique and system models the temperature of a virtual grid of nodes on the workpiece's surface and determines the effect of the laser beam on each node's temperature including the creation of the kerf. An optimization technique is then performed on the results from temperature model which creates a power data profile to indicate the correct level of power which the laser should be operated for every point on the laser cut. The technique and system is especially useful when boundary, turns or holes are required where the cutting conditions change creating excessive heat accumulation.

24 Claims, 6 Drawing Sheets

Microfiche Appendix Included
(8 Microfiche, 736 Pages)

SIMULATOR AND OPTIMIZER OF LASER CUTTING PROCESS

A microfiche appendix of a computer program for performing the techniques in accordance with the invention is attached to this document. There is a total of eight microfiche and 736 frames as part of the appendix.

TECHNICAL FIELD

The present invention relates to a system, method and apparatus for simulating the heat dissipation into a workpiece cut by a laser beam and improving the quality of the cutting process by stabilizing the workpiece temperature by adjusting the intensity of the laser beam responsive to the simulated heat dissipation.

BACKGROUND OF THE INVENTION

Laser cutting is a strongly growing, industry-accepted technology for materials processing. It is generally regarded that laser cutting systems are capable of producing high quality components. In order to achieve such results though, great effort and expertise are often required. High quality cutting is essential in that it eliminates post machining and cleaning operations, improves repeatability, reliability and accuracy of the finished part. These factors can significantly reduce the cost of manufacture and allows laser cutting to effectively compete against other more traditional machining processes. Apart from the high quality obtainable from such systems, process flexibility, high cutting rates and non-contact operation make laser cutting an extremely attractive alternative.

Although laser cutting systems are capable of achieving high quality, it is often difficult to produce cuts of consistent acceptability. Meticulous trial-and-error experimentation will generally lead to a set of laser cutting parameters which will adequately perform a desired task, so long as cutting conditions remain undisrupted. Disturbances are common though, and can be caused by many factors. Even small changes in certain laser parameters or conditions can produce significant variations in quality levels.

Most manufacturers can not and will not accept inferior parts. This is especially true when additional operations such as brushing, grinding or machining can damage the workpiece for its intended use or because of its inherent attributes. For example, thin intricate components can contain many small geometric features. Such traits often make post-operations physically impossible, or economically inviable. The effect of workpiece geometry and common profiling routines on cut quality are not conventionally well understood, and improvements in workpiece acceptability in such cases are crucial, as most applications are now of the two-dimensional (2D) contour type.

The desired geometric laser cutting operations, such as cornering and cutting near workpiece boundaries, cause severe heat accumulation due to the geometries of the workpiece. The heat accumulation results due to the necessary velocity change of the motion system when cutting a corner or from the approach to a boundary which frustrates the conduction mechanism. Heat build up also occurs when cutting a small diameter hole in the workpiece. If a laser cut is made close to an edge of a piece of steel, the heat conduction zone of the material is vastly reduced around the cut compared to if the cut was made in the middle of the workpiece. The excessive heat built up in the laser cutting area can cause poor quality in the form of widespread burning, increased dross, increased surface roughness and kerf widening. These problems can render the workpiece useless.

In laser cutting, where the heat fluxes are strong enough to melt the material, the problem of analyzing temperature distributions becomes complex due to the moving solid-liquid interface (called "cutting-front"). When cutting a line by a laser beam, the solid-liquid interface follows the movement of the beam by a varying amount which depends on the intensity and velocity of the beam and the characteristics of the workpiece. Efficient cutting occurs when the laser beam edge rides sufficiently ahead on the molten material and therefore little energy falls through the generated cut. When the beam velocity varies in the case of an approaching corner, for example, the cutting front attempts to follow the motion of the beam, but some lag occurs, and the beam energy may pass through the kerf that is not applied to the workpiece. At the same time, because the beam speed has decreased, more power per unit time is applied to the workpiece. These factors work contrary to each other on the workpiece temperature and the net effect alters the workpiece temperature and must be accounted for. Such a characterization of the process alters the amount of energy input into the interaction zone where actual cutting takes place, and therefore the cutting front position is expected to further change. Thus a uniform temperature of the cutting front on the workpiece is desirable in order to eliminate the effect from the varying relative positions of the beam front and the cutting front.

In order to control the heat accumulation on the workpiece caused by the cutting of the laser, the temperature at each point of the workpiece must be known or be approximated. Although thermo couples can be attached to the workpiece at discrete positions, one cannot be attached at the cutting front edge. The cutting front temperature is the critical temperature affecting quality, which requires stabilization. Therefore, such information cannot be obtained by thermocouples.

It is possible to model the temperature (and thus the heat accumulation) along the laser cut using known heat transfer equations. Previous attempts of modeling have assumed an infinite workpiece length and have not taken into account boundaries or the presence of the kerf, which is the slit made by the laser beam. When using a laser to cut intricate pieces, a number of boundaries and turns are required and it would be desirable for a numerical model to take these factors into consideration in order to properly model the temperature distribution. Previous attempts also have not considered the moving cutting front.

Once the model has been established for a particular configuration of laser and type of workpiece, it would be advantageous for the results of the model to be optimized and adapted to control the laser cutting operation in order to stabilize the temperature during the cutting process and remove the problems associated with heat build up. This would allow increased efficiency with the laser cutting process and a higher quality cut.

SUMMARY OF THE INVENTION

The invention is a system, method and apparatus for stabilizing the cutting front temperature of a laser beam on a workpiece in order to improve the quality and consistency of the cut. In accordance with the invention, the temperature of the workpiece is modeled based on data regarding the laser, workpiece and cut design. The temperature of nodes, which are defined as points on an overlaid virtual grid on the workpiece, are calculated for each incremental time period during the cutting process. The node temperature values are then optimized for the selected cut design in order to gain a stabilized cutting front temperature over the entire cutting process by checking the modeled temperature of previous nodes along the cut line at the incremental time periods (which are cut in secession) to ensure that the difference in temperature does not exceed a selected amount. If the temperature varies beyond the selected amount, the intensity of the laser beam is adjusted accordingly to alter the cutting front temperature for the particular node location.

The results from the optimizer can produce a power data profile which can be used by a laser apparatus repeatedly to make the same predetermined cut or may control the laser directly. The power data profile can also be used by multiple lasers for mass cutting operations.

BRIEF DESCRIPTION OF THE DRAWINGS

Further objects, features and advantages of the invention will become apparent from the following detailed description taken in conjunction with the accompanying figures showing a preferred embodiment of the invention, on which.

DETAILED DESCRIPTION

In order to solve the problem of accumulated heat on the workpiece caused by the laser beam, a modeling technique must be used because of the impracticality of using physical thermocouples for industrial operations. The modeling technique must take into account the type of laser beam being used, the type of material being used for the workpiece and the pattern of the cut to be made. Unlike previous attempted models, the inventive technique takes into account both the effect of the kerf on the heat dissipation and the workpiece geometry, as well as being a transient model instead of relying on steady state values. The inventive technique produces a model of workpiece temperature data (directly associated to heat dissipation) which is very close to actual operational values.

The generated temperature profile from the modeling technique is then used by an optimization technique which regulates the intensity of the laser beam responsive to the predicted temperatures on the workpiece. Thus, if a rise in heat accumulation is occurring because of an encroaching boundary, the optimizing technique will reduce the intensity of the beam in order to stabilize the temperature. The optimizing technique could also change the speed of the laser cutting beam to affect the temperature. An increase in the speed of the laser beam may reduce the temperature accumulation at a given point on the workpiece. However, the speed cannot be too great or the complete cut will not be made on the workpiece. As described below, the results from the optimizing technique can either immediately affect the laser beam or produce a power data profile which can be subsequently used by the laser.

A laser controlled by the optimized temperature data will perform improved quality cuts and be more consistent over a number of cuts. Quality can be measured by uniformity or by different criteria including kerf width, the inner slope of the kerf, the heat affected zone extent, the dross appearance and the surface roughness (striations). Some of the quality characteristics are macroscopically evaluated, such as kerf width and dross appearance, while others such as surface roughness and heat affected zones are microscopic attributes. Quality is improved by the present invention through reduced kerf widening effects, reduced corner melt-off and reduced heat affected zones.

The temperature at each node in a virtual grid laid over a particular workpiece and a selected laser cutting configuration can be calculated using a numerical approach. A number of parameters are required for the model and are entered by an operator or stored in a data file in order to identify the particular type of material and its properties, the type of laser beam and type of assist gas used in the laser cutting process. The required input data is shown in Table 1 and described below. The input values shown are for a mild steel workpiece and a $CO_2$ laser.

TABLE 1

Physical Quantities And Parameters Used In The Numerical Model

| | | | |
|---|---|---|---|
| 1) | Gaussian $TEM_{00}$ $CO_2$ | 8) | Assist gas: $O_2$ |
| 2) | 5" focal lens | 9) | K = 51 W/mK |
| 3) | amu = 71.847 g/mol | 10) | $T_{melt}$ = 1809.15K |
| 4) | $R_b$ = 125 $\mu$m | 11) | $\sigma_b$ = 5.67E−8 $W/m^2K^4$ |
| 5) | $A_b$ = 0.4 | 12) | $L_f$ = 275 kJ/kg |
| 6) | $\alpha$ = 1E−5 $m^2/s$ | 13) | $\rho$ = 7865 $kg/m^3$ |
| 7) | $\Delta H$ = −257.58 kJ/mol | 14) | $\Delta x = \Delta y$ = 250 $\mu$m |

Each parameter may be inputted by the operator directly, selected from a menu of options, be predetermined for a given laser cutting system or read from a data file previously created. The first parameter is the transverse electromagnetic mode of the laser to be used. This parameter defines the intensity distribution of the laser beam. For example, a Gaussian distribution is labeled $TEM_{00}$. The type of laser is also indicated, in this example $CO_2$. The second parameter to be entered is the focal length of the lens in the selected laser. The third parameter is the atomic mass unit (amu) of the workpiece. The example given above is for a particular grade (mild) of steel and the value for any material should be readily accessible from a conventional data table. Mild steels represent a significant proportion of all materials processed by the $CO_2$ laser. In almost all cases, laser cutting of mild steel is carried out with the assistance of an oxygen gas stream to produce an exothermic reaction, which increases both the efficiency and quality of cut possible. In order to speed up the input process, the operator may simply select the workpiece type from a menu and the associated material properties can be stored in a database and accessed and used for the modeling technique. This would reduce the required number of inputs for the operator.

The fourth parameter is the laser beam radius ($R_b$). The fifth parameter is the absorbitivity ($A_b$) of the material to be cut which indicates the reactiveness of the material used. The value can be obtained from a conventional data table listing material properties.

The sixth parameter is the thermal diffusivity. The value can be obtained from a conventional data table listing material properties.

The seventh parameter is the exothermic energy release of a given material which is to be cut with a laser beam. This parameter is related to the use of an assist gas as described below and is a constant value for a given material. The value can be looked up in a conventional data table regarding material and their properties.

The eighth parameter required is the type of assist gas used in the cutting process. In this example, the assist gas is oxygen. This process in this example is termed oxygen-assisted or reactive-gas laser cutting, as opposed to vaporization cutting or simple fusion (melt-and-blow) cutting. Such a distinction is important because oxygen-assisted laser cutting of mild steel often exhibits process mechanics and phenomena far different to other processed materials, and is therefore studied as a separate class of laser processing.

The ninth parameter is the thermal conductivity (K) of the material of the workpiece. The thermal conductivity relates to the transfer rate of heat through the material. This parameter can also be looked up in a conventional data table.

The tenth parameter is the melting temperature ($T_{melt}$) of the material which is to be cut with a laser. The melting temperature can be looked up in a conventional data table.

The eleventh parameter is the Stefan-Boltzmann constant which is well known in the art. This constant does not need to be entered but is stored in the model generating module. The constant is used for calculating the heat transfer coefficient as explained below.

The twelfth parameter is the latent heat of fusion ($L_f$) for the particular material which is to be cut with a laser. This parameter relates to how much heat is required to melt a portion of the material. This value can be looked up in a conventional table for the material used.

The thirteenth parameter is the density ($\rho$) of the material to be used and can be easily looked up. The last parameter is the step size of the temperature nodes to be calculated in the simulation module. The step size will define the grid of node points which will virtually overlay the workpiece and be used for the optimization technique. In this example, the distance between the nodes on the workpiece in the x and y directions is 250 $\mu$m. An alternate selected parameter could be 125 $\mu$m if a finer scale is required.

Once the data inputs have been entered by the operator, the operator must enter the desired cut operation. This can be accomplished by entering the physical dimensions of the workpiece and the cut design using a coordinate system or can be entered interactively by using a mouse or other input device and drawing a cut line on a workpiece. Alternatively, the cut design can be selected from a menu of standard cut designs or by any other conventional manner.

The temperature modeling technique then produces a temperature map of the workpiece for each node for incremental time periods during the cutting process. The incremental time period is determined based upon the current speed of the laser beam and knowing the grid step size. The produced data will later be used by the optimization technique.

Some basic rational assumptions are required by the modeling technique. The modeling technique assumes that the thermo-physical properties are constant for the material and that the temperature distribution is homogeneous along the depth of the workpiece. Therefore, the temperature of a node in the surface of workpiece is applicable to the entire depth of the workpieces. The assumptions are reasonable when the workpiece is a thin plate which is the typical workpiece for a laser cutting job. During the laser cutting process, the laser beam heats up and melts the material directly beneath it. The pressure from the oxygen supplied through a nozzle directed towards the cutting area then blows the molten material away. A cut is generated as the beam traverses across the workpiece. The material removal process is a rather complex interaction of the gas jet on the free surface of the metal. It is assumed in the model that any area in the molten state is expelled out of the kerf immediately, by the force of the jet. Forced convention from the blown gas provides some cooling to this region, but its contribution is greatly outweighed by the exothermic reaction that is produced between the oxygen and the molten material. Fully developed turbulent flow is assumed for the forced convection case, although turbulence within the kerf can somewhat be minimized by adjusting the nozzle-standoff position.

Heat transfer to the substrate holding the workpiece can also be a factor, although it is assumed that a nail bed, honeycomb or mesh support is used, causing the conductive effect to be negligible.

The numerical approach of the heat dissipation model is now described. A two dimensional heat conduction equation is the underlying basis for the model because the workpiece is preferably thin:

$$\frac{K}{\rho c_v} \left( \frac{\partial^2 T}{\partial x^2} + \frac{\partial^2 T}{\partial y^2} \right) + \frac{\dot{q}}{\rho c_v} = \frac{\partial T}{\partial t} \tag{1}$$

where T is the temperature at a particular node (x,y), $c_v$ is the heat capacity of the material, and $\dot{q}$ is the heat generation amount of the material at the particular node.

The initial temperature distribution at time $t=t_0$ is:

$$T(x,y,t_o) = T\infty(x,y) \tag{2}$$

where $T(\infty)$ is the ambient room temperature. The existence of temperature boundary conditions must be taken into account and allow for convection and radiation in the surrounding areas with the equation:

$$-K_b \frac{\partial T}{\partial n} \bigg|_b = (h_c + h_r)(T_b - T_\infty) \tag{3}$$

where $h_c$ represents the mixed convective heat transfer coefficient; $h_r$ represents the radiative heat transfer coefficient; n denotes the outward normal coordinate from the boundary and subscript b denotes a boundary point. The boundary temperatures $T_b$ need to be solved for as described below.

The radiative heat transfer coefficient must also be determined. The heat loss can be approximated by:

$$q_r = \xi \sigma_b A (T_b^4 - T_\infty^4) \tag{4}$$

where $q_r$ is the radiative heat loss; $\epsilon$ is the emissivity of the material being cut; and A is the area of the workpiece. Next, by definition:

$$q_r = h_r A (T_b - T_\infty) \tag{5}$$

Then, by combining equations 4 and 5, the resultant equation is:

$$h_r = \xi \sigma_b (T_b + T_\infty)(T_b^2 + T_\infty^2) \quad (6)$$

As can be seen by equation 4, the radiation element is dominant at high temperatures because the fourth-power relationship.

At all points other than where the oxygen gas jet impinges, it is assumed that there is no far-field streaming and thus natural or free convection occur. Although the free convection contribution is relatively small, it is included in the modeling technique for the sake of completeness. The Dittus-Boelter formula (which is known in the art) is use to determine the Nusselt number (which equation is also known in the art) as expressed below:

$$Nu_d = 0.027 Re_d^{0.8} Pr^{0.33} (\mu_m/\mu_w)^{0.14} \quad (7)$$

The forced convective heat transfer coefficient ($h_f$) is thus expressed as $$h_f = Nu_d K/d \quad (8)$$

Now the transient heat conduction equation can be expressed in differential form as follows:

$$\frac{K}{\rho c_v} \left( \frac{\partial^2 T}{\partial x^2} + \frac{\partial^2 T}{\partial y^2} \right) + \frac{\partial T}{\rho c_v \partial z}(h_f + h_n + 2h_r) + \frac{\dot{q}}{\rho c_v} = \frac{\partial T}{\partial t} \quad (9)$$

Thus the z coordinate axis of heat transfer (the convection transfer) is now accounted for.

Next the radial intensity distribution of the laser beamed is generated. The distribution is dependent on the type of laser beam which was entered as one of the inputs by the operator. If the laser source is a Gaussian $TEM_{00}$ mode, then the radial intensity distribution is expressed as the following:

$$I(r) = I(0) exp(-2r^2 R_b^2) \quad (10)$$

where I(O) is the peak intensity, r is the radial distance from the beam center, $R_b$ is the laser beam radius at which the power distribution falls within the industry accepted $1/e^2$ level other types of lasers would have different intensity distribution equations of the energy arriving to the cutting front, only a small percentage is absorbed. Thus is especially true when depolarized or circularly polarized beams are used, as in the case with coordinated motion laser cutting systems. The radial absorbed beam power is thus given as:

$$P_b(r) = A_b I(r) = (1 - r_f) I(r) \quad (11)$$

where $A_b$ is absorbitivity and $r_f$ is reflectivity.

Next, the energy produced by the exothermic reaction of the metal with the assist gas must be considered. Previous studies have shown that approximately 50% of the melt ejected from the kerf when a steel workpiece is cut by a laser is Fe and the rest is almost completely FeO. Thus the following reaction occurs within the cutting kerf when the laser is applied in the presence of the assist gas:

$$Fe + 0.5 O_2 = FeO \quad (12)$$

$$\Delta H = -257.58 kJ/mol \quad (13)$$

where $(\Delta)H$ is the energy released during the reaction. If the mass removal rate of the melt out of the kerf is known or can be calculated, then the following relationship can be used to determine the energy released from it:

$$P_{exo} = \text{ratio} \left( \frac{m \Delta H}{amu} \right) \quad (14)$$

where amu=1 mole of FE (which is 71.847 g/mol) and the ratio in equation 14 is the percentage of FO:Fe ejected from the kerf.

Because the material within the kerf is melted and expelled, it is necessary to consider latent heat effects. In laser welding, this is often neglected because the latent heat of fusion is compensated by the latent heat of solidification. In cutting through, the material is removed and as such, only a small liquid layer along the walls of the kerf can contribute to this heat of solidification. Thus, $$P_{melt} = \dot{m} L_f \quad (15)$$

where $L_f$ was input by the operator; $\dot{m}$ is the melt removal rate; and $P_{melt}$ is the melting power. The material remove rate $\dot{m}$ can be approximated with the following equation:

$$\dot{m} = \rho b D V_f \quad (16)$$

where $\rho$ is the density of the material to be cut, b is the kerf width, D is the material sheet thickness and $V_f$ is the velocity of the cutting front. The velocity of the cutting front which creates the kerf is used instead of the velocity of the laser beam. If the beam speed is too high, then melting will cease and the developed model will indicate that full penetration cutting will not occur.

The above heat calculations are used to predict the temperature at any given point on the workpiece.

Figure 1:
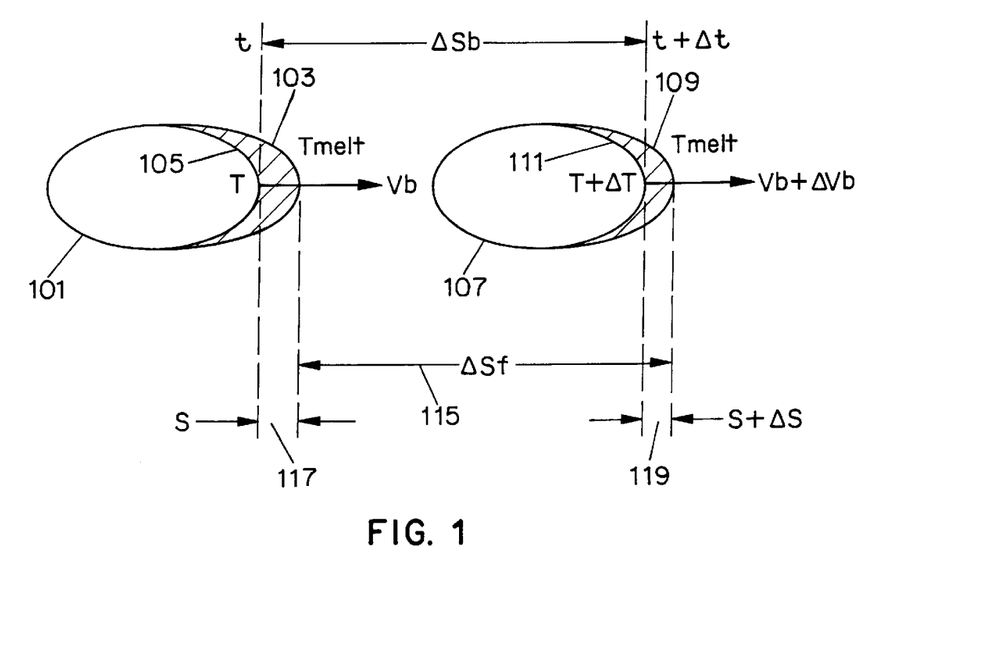
FIG. 1 is a diagram showing a laser beam cutting a workpiece over an incremental time period.

The ability of the numerical model to calculate the change in temperature when the laser beam is cutting is explained with reference to FIG. 1. FIG. 1 shows a representation of a laser beam cutting a workpiece at two different points in time, t and t+Δt. Referring to FIG. 1, beam mark 101 indicates the laser beam being applied to a material to be cut which consists of the outer lines of the oval shown. Beam front edge 103 is the forward side of the beam edge which is moving in the direction indicated by the arrow. The cutting edge 105 (liquid-solid interface) shows where the material of the workpiece is being melted away. To the left of the cutting edge 105, the kerf appears with no material in it due to the blowing gas. Molten metal which is being melted to make the cut appears between cutting edge 105 and beam edge 103. Beam mark 107 show the location of the laser beam at time t+Δt when the beam has progressed along the cut line near a boundary. Beam mark 107 has both a front beam edge 109 and a cutting edge 111. However, the distance between the two edges changes by Δs when a boundary is approached or a turn is made due to the change in heat accumulation. Line 113 shows the distance which the beam has traveled and line 115 shows the distance which the molten edge has traveled. They are not equal distances when a boundary is approached or turn is being made as indicated by distance S 117 and S+ΔS 119.

The determination of the mass removal rate, an aspect which has not previously been modeled in the prior art, is dependent upon firstly evaluating the cutting front speed. From FIG. 1, it can be shown that:

In the time interval Δt, an expression for the front beam velocity can be ascertained:

$$\frac{\Delta S_f}{\Delta t} = \frac{\Delta S_b}{\Delta t} + \frac{\Delta S}{\Delta t} \tag{18}$$

As t approaches 0, the following equation showing the instantaneous rate of change is produced:

$$\frac{\partial S_f}{\partial t} = \frac{\partial S_b}{\partial t} + \frac{\partial S}{\partial t} \tag{19}$$

which can be expressed as $$V_f = V_b + \frac{\partial S}{\partial t} \tag{20}$$

where $\Delta s/\Delta t$ is the time rate of change of the molten layer thickness. The molten layer thickness is given by the shortest distance from the melting isotherm to the laser beam's center at any given time t (see FIG. 1). The melting isotherm then represents the solid-liquid interface. A numerical expression for the average time rate of change of the molten thickness over the interval $\Delta t$ can be obtained for evaluating the beam front velocity by using a method of the first order interpolation between the nodal temperature $T_m$ an the forward shifted $T_{m+1}$. At time j, $$S^j = \Delta y \frac{(T_m^j - T_{melt})}{(T_m^j - T_{m+1}^j)} \tag{21}$$

where m denotes the nodal point of interest in the y direction. By analogy, at time $t+\Delta t = j+1$, $$S^{j+1} = \Delta y \frac{(T_m^{j+1} - T_{melt})}{(T_m^{j+1} - T_{m+1}^{j+1})} \tag{22}$$

from which we derive:

$$\frac{\Delta S}{\Delta t} = \frac{(S^{j+1} - S^j)}{\Delta t} \tag{23}$$

Figure 2:
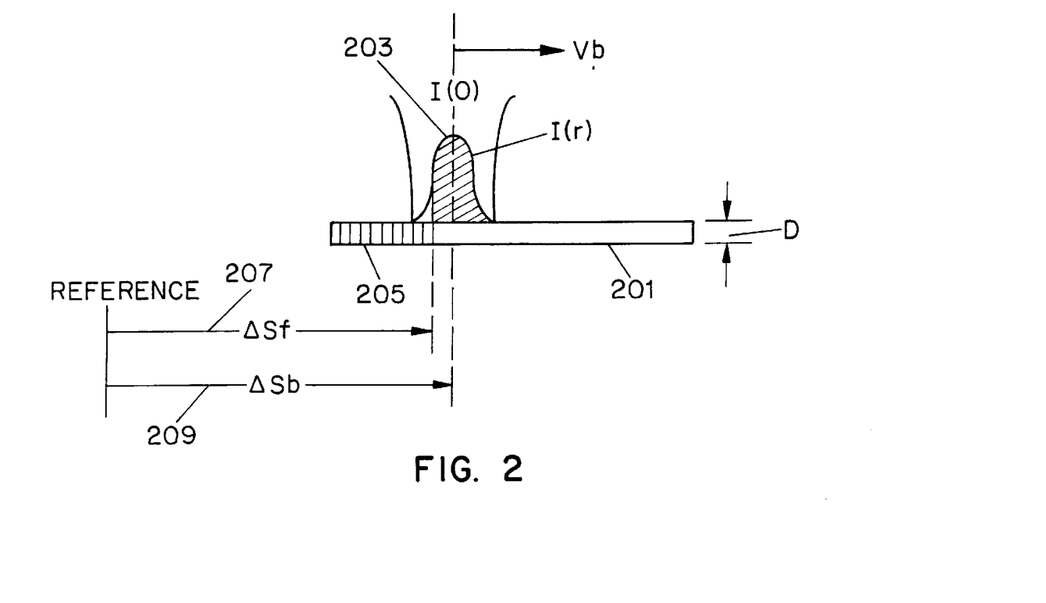
FIG. 2 is a diagram of a side view of a laser beam's absorption and transmission loss during a laser cutting operation.

FIG. 2 depicts a side view of a laser cutting operation on a flat material. The workpiece 201 is shown. Area 205 of workpiece 201 has been already cut by the laser and a kerf created. Laser intensity representation 203 shows the relative intensity of the beam responsive to the beam type. Reference line 207 shows $\Delta S_f$ and reference line 209 shows $\Delta S_b$. The percentage of power incident on the workpiece is given by the proportion that the cutting front is ahead of the trailing edge of the laser beam. If the cutting front is behind the trailing edge of the laser beam, then all the beam power will fall on the workpiece. However, normally, some beam leakage occurs.

Figure 3:
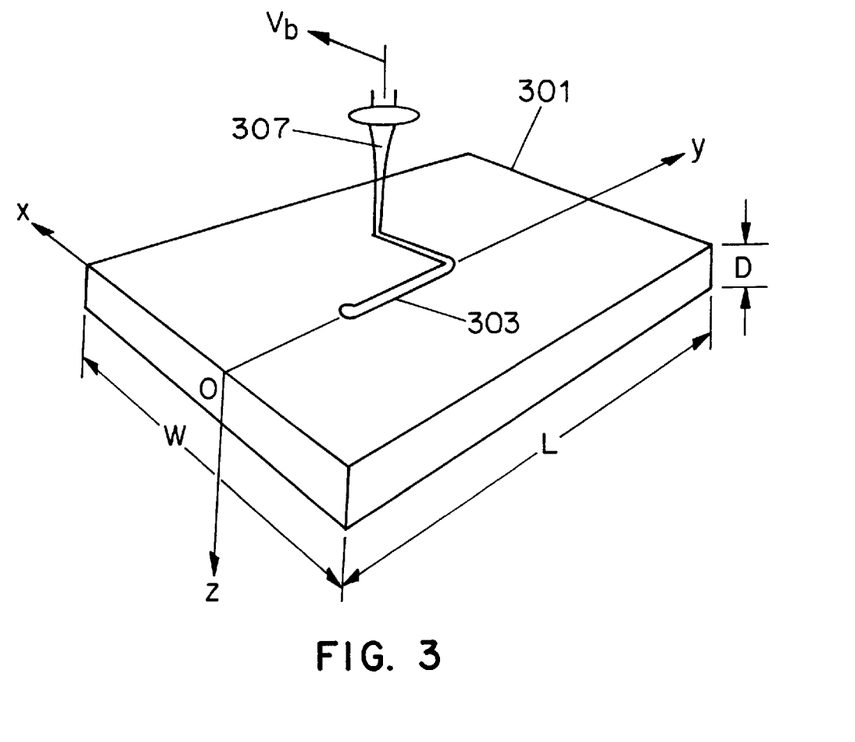
FIG. 3 is a graphical depiction of a workpiece with boundaries used in the modeling technique in accordance with the invention.

FIG. 3 shows the modeled workpiece used in the modeling technique. Workpiece 301 is represented as a finite rectangle with a cutting line 303 indicating where the laser beam 307 will be applied. The workpiece 301 is fixed in the Cartesian plane while the laser beam is assumed to move relative to it. Alternatively, the beam could be fixed in location with the workpiece being move in a controlled matter to make the proper cuts. If the laser is restricted to cutting along the centerline of the workpiece only, then half of the width can be considered as the temperature distribution will be symmetrical about the OY axis as indicated in the diagram. If this is the case, computation effort is reduced and the solution can be achieved quicker. After material is expelled from the kerf when the workpiece 301 being cut by the laser beam, conduction cannot now occur across the empty region of the kerf as these points are now part of the convective environment and do not conduct heat in the same fashion as the rest of the workpiece. The modeling technique accomplishes this by removing all nodes on the workpiece with calculated temperatures above the melting point of the material used which fall within the extent of an assist gas stream. Thus the effect of the kerf made from the cutting process is accounted for.

Heat diffusion equations, as described above, are determined for all nodal points within the modeled workpiece and at the boundaries. The temperature equation for the drilling temperature of the workpiece before any cut is made in the workpiece is defined as:

$$T_{m,n}^{j+1} = \frac{T_{m,n}^j + \sigma \left[ \begin{array}{c} \frac{H}{KD} + T_{m-1,n}^{j+1} + T_{m+1,n}^{j+1} + \\ 2T_{m,n+1}^{j+1} + Bi_f \frac{T_\infty \Delta y}{D} + Bi_n \frac{T_\infty \Delta y}{D} + 2Bi_r \frac{T_\infty \Delta y}{D} \end{array} \right]}{\left( 1 + 4\sigma + \sigma Bi_f \frac{\Delta y}{D} + \sigma Bi_n \frac{\Delta y}{D} + 2\sigma Bi_r \frac{\Delta y}{D} \right)} \tag{24}$$

where $$H = P_b(0) - P_{melt} \tag{25}$$

$$\sigma = \frac{\alpha \Delta t}{\Delta y^2} \tag{26}$$

$$Bi_f = \frac{h_f \Delta y}{K}, Bi_n = \frac{h_n \Delta y}{K}, Bi_r = \frac{h_r \Delta y}{K} \tag{27}$$

where $\alpha$ is the thermal diffusivity and $B_i$ is the mesh sized biot number. The equations are for the conditions X=0 and 0<Y<L on an overlaid virtual grid and when the assist gas used in the laser cutting process is air. The Gauss-Seidal iteration method, which is known in the art, is used to solve the above equation. The equation represents blast drilling an initiation keyhole prior to the other cutting operations with air assistance. Two ways to create the keyhole can be used in practice. The first is by pulsing the laser with an assist gas. This method generally takes a long time but produces neat starting holes. The second method commonly used is blast drilling. It uses continuous wave beam power with an assist gas to blow the melted material away. This method is quicker but produces poorer quality key holes. The model is used for either method.

When cutting is underway, the equation is changed because of the existence of a kerf. The equation now becomes $$T_{m,n}^{j+1} = \frac{T_{m,n}^j + \sigma \left[ \begin{array}{c} \frac{H}{KD} + T_{m+1,n}^{j+1} + 2T_{m,n+1}^{j+1} + Bi_f T_\infty + \\ Bi_f \frac{T_\infty \Delta y}{D} + Bi_n \frac{T_\infty \Delta y}{D} + 2Bi_r \frac{T_\infty \Delta y}{D} \end{array} \right]}{\left( 1 + 3\sigma + \sigma Bi_f + \sigma Bi_f \frac{\Delta y}{D} + 2\sigma Bi_r \frac{\Delta y}{D} + \sigma Bi_n \frac{\Delta y}{D} \right)} \tag{28}$$

where $$H = P_b(0) + P_{exo} - P_{melt} \tag{29}$$

The temperature model changes to this equation for the nodes which fall within the cutting line. The presence of kerf makes diffusion more difficult, and forces the cutting front temperatures to be higher than those expected with previous well behaved analytical models.

Once the discrete equations have converged for time period j, the modeling technique determines the current front velocity and the exothermic power at a given node. The status of the laser beam position is then updated and a new incremental time step solution is obtained for each node. The modeling technique then repeats the procedure until the virtual laser beam reaches a user-specified final stopping position. The final output of the modeling technique is a group of data for each node on the workpiece at every incremental time step for the predetermined cut pattern. The nodes along the cutting path are also identified.

A microfiche appendix contains the source code to accomplish the modeling technique and solve the modeling equations. The program accounts for different configurations which cause changes in the cutting front temperature including approaching a boundary, turning a corner and drilling a hole. The programming modules include: a simulation of a normal linear cutting process where the kerf is generated along a centerline and a possible boundary exists; a simulation of the corner cutting process under current industry practices and along the centerline of a workpiece; a simulation of a normal hole cutting process; and optimization routines based on laser beam power or beam speed for each of the above geometric configurations.

The presence of a uniform cutting front temperature during a laser cutting operation improves the quality of the cut in various ways. It produces increased quality cuts by maintaining kerf widths more consistently, produces more uniform heat affected zones and reduces the amount of wide spread burning. The burning is due to the presence of the oxygen stream impinging on an excessively over-heated piece, whereby the ignition point is reached and an uncontrolled strongly exothermic reaction results. At the very least, uniform cutting front temperatures preclude the variability in cut quality which increases the odds that the final workpiece will reach acceptable standards.

In order to achieve uniform cutting edge temperatures, an optimization technique is performed which forces the cutting front temperature to remain steady right up to a prescribed boundary and over the course of the entire laser cut. The technique allows for a steady state temperature value by retrieving the cutting front temperature continually from the temperature data generated in the model and adjusting the power of the laser in order to adjust the steady state value of workpiece surface temperature.

Figure 4:
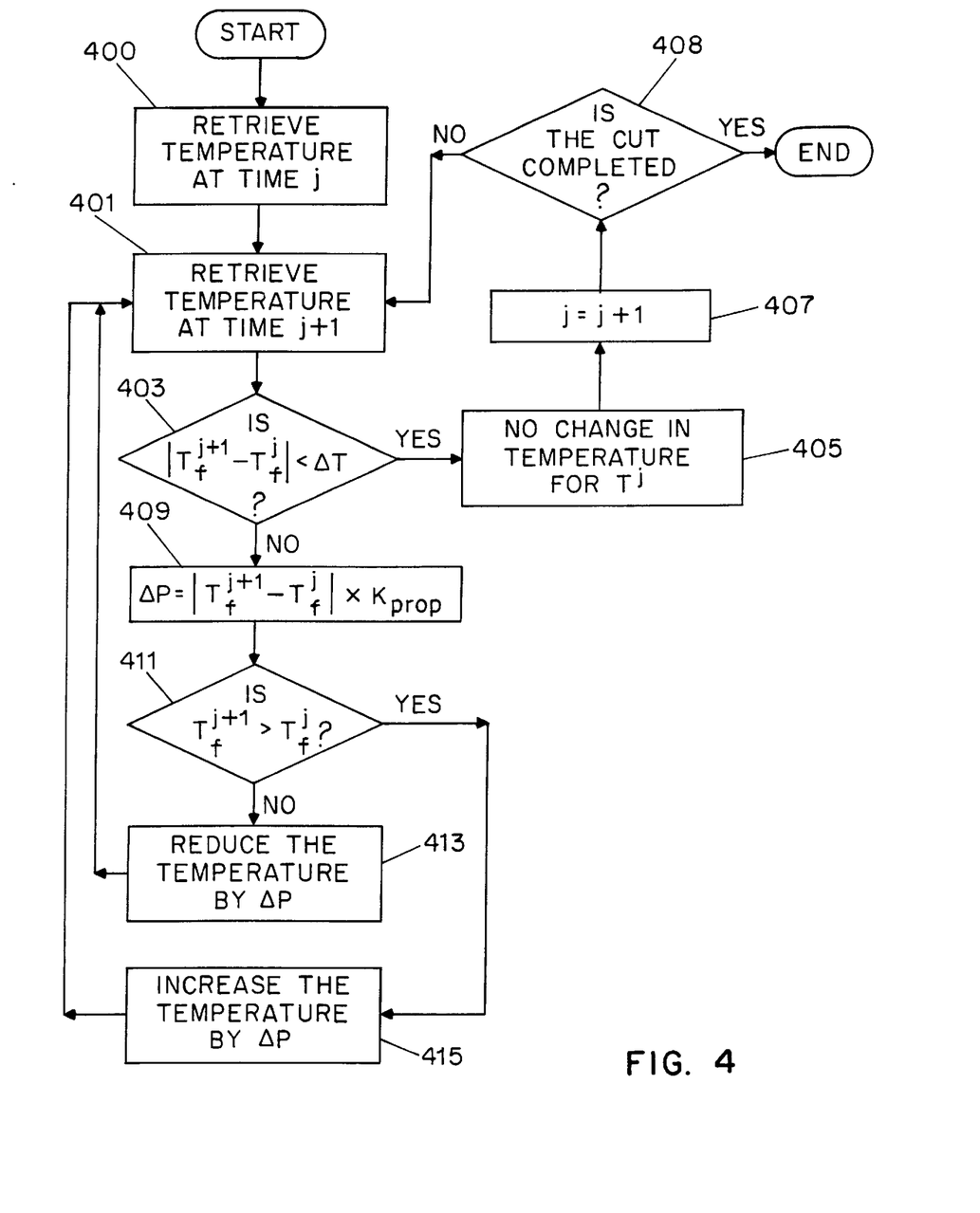
FIG. 4 is a flow chart of the steps of the optimization technique performed to stabilize the cutting front temperature of the laser beam on the workpiece.

FIG. 4 shows a flow chart of the steps of the optimization technique. Step 400 retrieves the calculated temperature of the cutting front at the starting node at a reference time j from the data generated in the model. This technique will compare the temperature with the node at the next location along the cutting line at time j+1 because the cutting front is always moving as it cuts.

Step 401 retrieves the temperature data of the next node along the cutting edge from the model data corresponding to the next time interval. The temperature for all nodes on the workpiece have been previously calculated for each time j during the cutting process in the modeling technique. The time intervals depends on the speed of the laser which is cutting the metal, among other factors.

Step 403 compares the temperature of the next time interval j+1 (corresponding to the next laser position on the next node) to the current reference temperature at time interval j. It calculates the absolute value of the difference of the two temperatures and compares it to a variable temperature $\Delta T$. If the absolute difference is less than $\Delta T$, then the temperature differential is within an acceptable range and no adjustment to the laser power is necessary. $\Delta T$ is either inputted by the operator or is predetermined by the model and previously stored. If the absolute difference is less than $\Delta T$, then the technique continues with step 405. If the absolute difference is greater than or equal to $\Delta T$, then the process continues with step 409.

Step 405 makes no adjustment to the power of the laser. The technique continues with step 407. Step 407 increments the time j to the next time interval for reading the temperature data regarding the next node along the cutting edge. The modeled laser beam would correspondingly move to the next node. The technique then continues with step 408.

Step 408 checks if j has been incremented sufficiently to complete the entire planned cut of the workpiece. If the laser cut is completed, then the optimization technique is finished. If the laser cut is not yet complete, then the process continues with step 401.

Step 409 calculates a $\Delta P$, the amount of change in power to modify the laser beam power, by taking the absolute value of the difference between the cutting front temperature at time j and the cutting front temperature at time j+1 and multiplying it by a proportionality constant $K_{prop}$. $K_{prop}$ is selected for a particular type of laser and the type of material being cut.

Step 411 checks if the cutting front temperature at time j+1 is greater than or lower than the cutting front temperature at time j. If it is greater, then the technique continues with step 415. If not, the technique continues with step 413.

Step 413 increases the temperature of the node by increasing the power of the laser by $\Delta P$. The optimizing routine can either be running concurrently with the actual cutting of the workpiece or can store the data in a file to be later used to control the physical operation of the laser. The process then returns to step 401 to determine if the change in temperature (and thus change in power of the laser) was sufficient to stabilize the temperature of the adjacent node.

Step 415 reduces the temperature of the node by reducing the power of the laser $\Delta P$ (either directly or by storing the data in a file for later use). The process then returns to step 401 to see if the change was sufficient to stabilize the temperature with the next node at time j+1.

Figure 5:
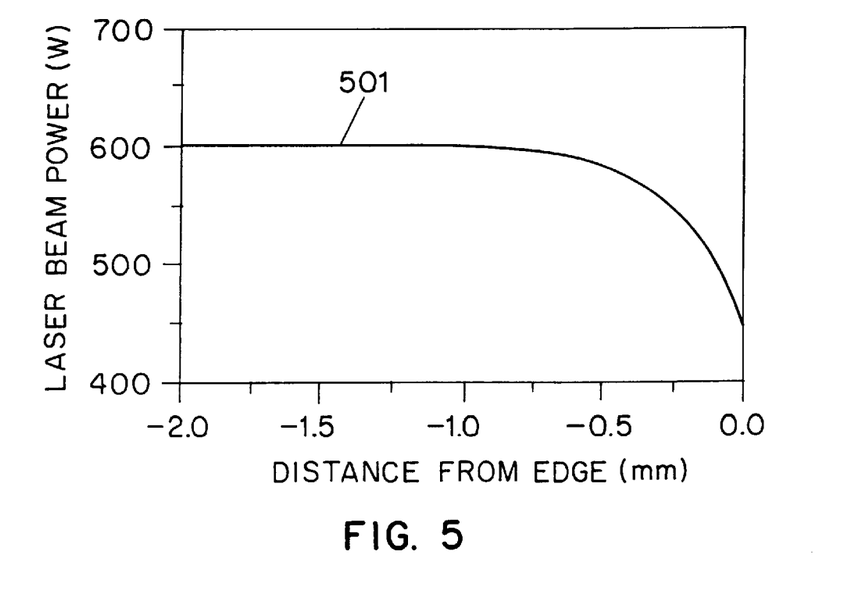
FIG. 5 is a graphical representation of a laser beam power data profile produced by the optimization technique shown in FIG. 4.

FIG. 5 shows a laser beam power data profile generated by the optimization routine of FIG. 4 which is stored in a data file. The data file is then transferred to a laser system and controls the laser beam power for one or more cuts. The laser power profile is customized to the particular laser and material being cut by the parameters entered previously as shown in Table 1. Data line 510 shows the required power of the laser beam for the last couple of positions from an approaching edge. The complete profile runs for the entire cut which was selected by the operator. The profile can be reused again and again for mass production operations. Alternatively, the laser power profile can be immediately used by a coupled laser. In the case shown in FIG. 5 of approaching on edge, the power is reduced to lower the temperature on the workpiece due to the lack of conducting material to distribute the heat near the edge.

Figure 6:
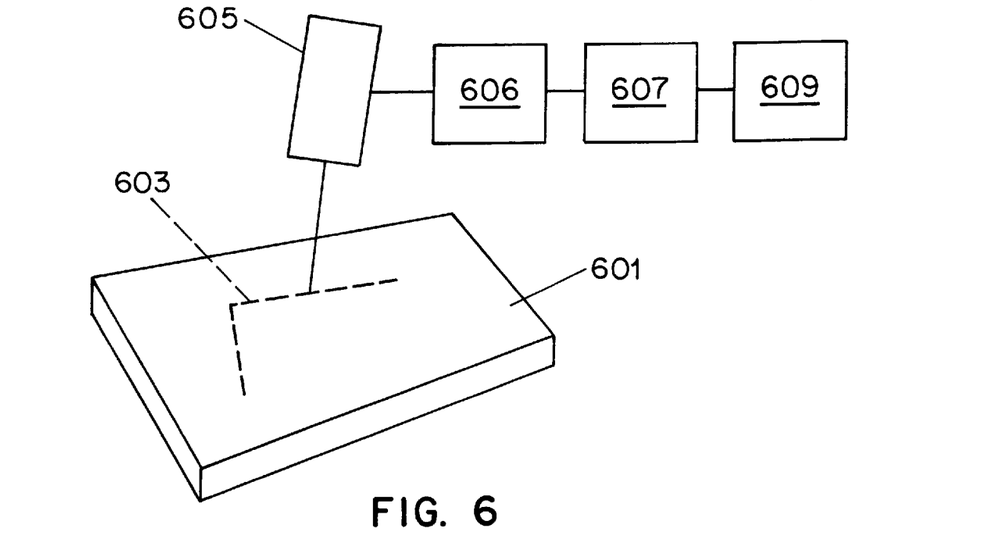
FIG. 6 is a diagram of a system for stabilizing the cutting front temperature of a beam on the workpiece to improve the quality of the cut made by the laser beam.

System 600 shows a system for controlling the temperature of the workpiece to make a better quality cut. System 600 includes a workpiece 601 to be cut by a laser 605, controller 606 which can increase or decrease the power or velocity of the laser, processing unit 607 which can model the temperature of the surface of workpiece 601 and optimize the temperature to produce a power data profile for the selected cut design about to be made on workpiece 601, and a data entry device 609 to allow an operator to enter information about the selected laser type and workpiece material being used. Data entry device 609 also allows for data entry regarding the specific cut design to be made in the workpiece.

Processing unit 607 contains a central processing unit, memory, a data interface and other conventional components required in a data processing unit. A program containing code for generating the temperature model, such as the program in the microfiche appendix, is stored in the memory. Controller 606 could be part of processing unit 607 and generate output signals which directly control the laser 605.

In system 600, an operator enters some or all of the data entries listed in Table 1 above via data entry device 609 to describe the parameters of the system and cut design about to be made. The data is sent to controller 607 which processes the parameters in accordance with the invention to produce data representing node temperatures for each time j before and during the cutting operation. Processing unit 607 also optimizes the temperature by producing a power data profile for the laser in accordance with the technique described with FIG. 4 and sends the power profile to controller 606. A velocity profile can also be produced and used. A benefit of the invention is that all of the processing in the modeling and optimization techniques can be performed prior to the scheduled laser cutting operation. Controller 606 then controls the laser's power (and correspondingly its beam intensity) according to the power profile. Workpiece 601 is positioned relative to laser 605 on a grid with a reference shoulder to ensure laser cuts in the same relative locations for multiple pieces. Suction cups can be used to hold workpiece 601 in place. Laser 605 then performs the cutting operation with a beam whose intensity is changed according to the power profile. If the laser velocity slows down near a corner, the beam intensity will be reduced initially to keep the temperature of the workpiece uniform.

Figure 7A:
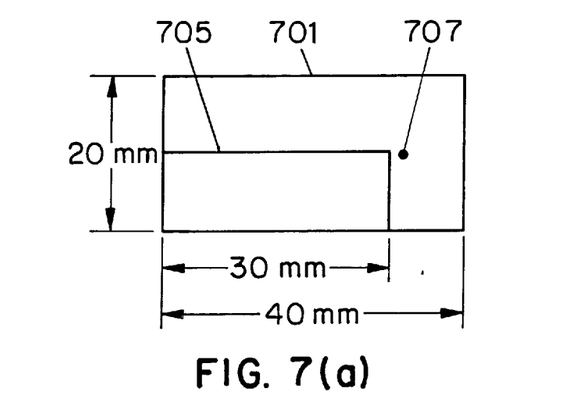
FIG. 7 is a top view of a workpiece used with a thermocouple to verify the operation of the modeling technique.
Figure 7B:
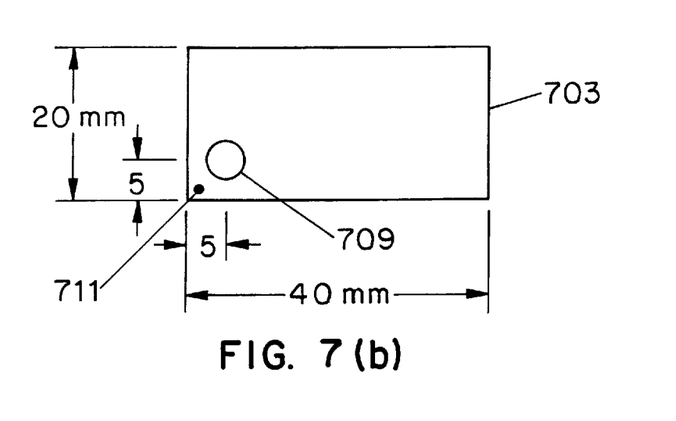
Figure 8A:
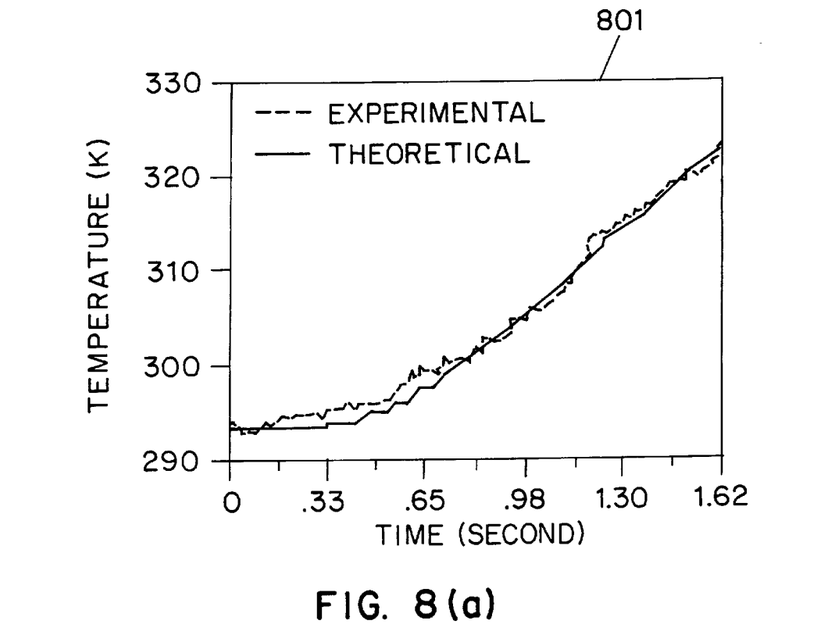
FIG. 8 is a group of comparison graphs of the temperatures of the workpiece at a particular point from both the modeling technique and the actual experiments on a workpiece.
Figure 8B:
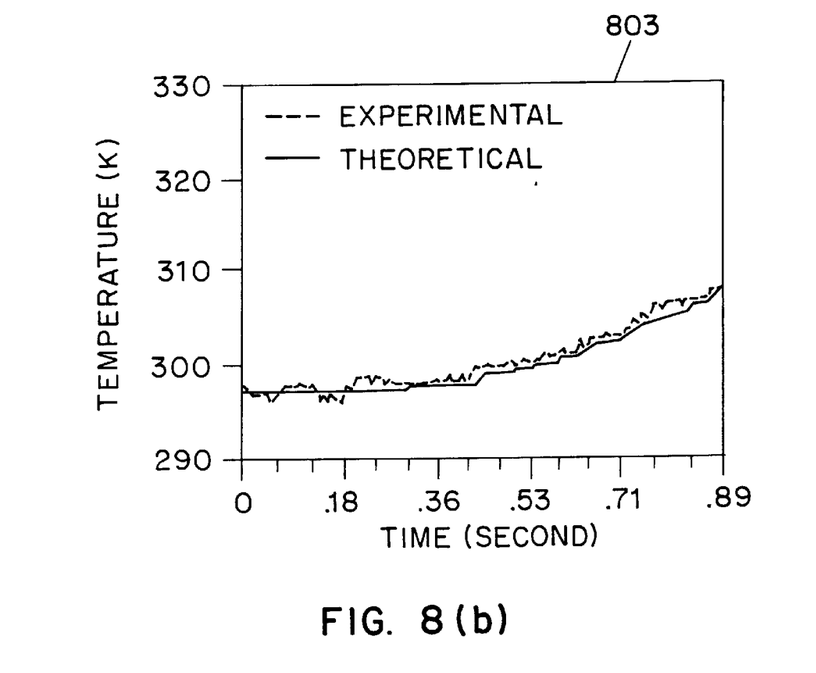
Figure 8C:
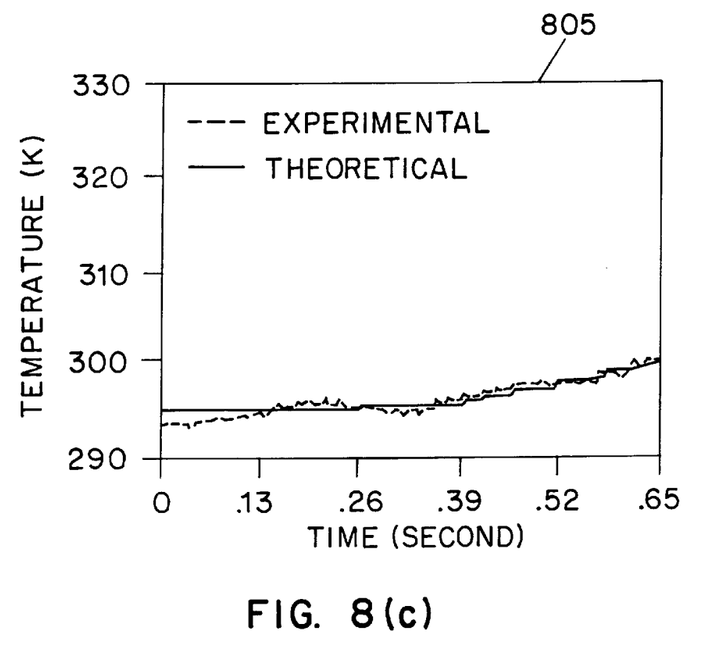
Figure 8D:
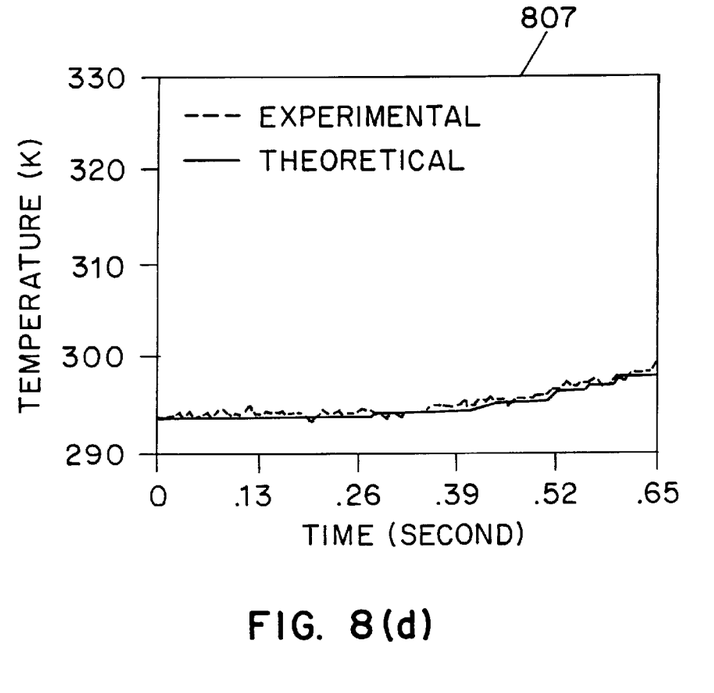

The modeling technique described above has been verified as being accurate with actual experimentation to show that the calculated temperatures at the nodes fall within reasonable error limits. FIG. 7 shows an example of workpiece dimensions and thermocouple locations when performing a corner cut and a small diameter hole cut. Workpiece 701 is a piece of mild steel which is to have a corner cut performed on it. Cutting line 705 shows the line upon which the laser will be directed. Thermocouple 707 is embedded in the steel 2 mm out from the generated cutting line.

Workpiece 703 is a piece of mild steel which is to have a small diameter hole cut in it. A 5 mm diameter hole, shown by edge 709, is to be cut in the workpiece by the laser. The thermocouple 711 is embedded 2 mm in from the actual workpiece corner point. The thermocouples are placed to avoid high temperature gradients closer to the line of cut. The data from the thermocouple is triggered via an electric relay in the controller.

FIG. 8 shows a group of graphs which show typical thermocouple measurements as compared to the temperatures produced from the modeling technique. The graphs could be shown prior to the execution of the optimization technique to ensure that the underlying modeling technique is within a reasonable error limit. Graph 801 shows the temperature at the thermocouple verses the time during the laser cutting process with a beam power of 600 Watts and a beam speed of 10 mm/sec. Graph 803 shows the temperature at the thermocouple verses the time during the laser cutting process on mild steel with a beam power of 600 Watts and a beam speed of 20 mm/sec. Graph 805 shows the temperature at the thermocouple verses the time during the laser cutting process with a beam power of 600 Watts and a beam speed of 30 mm/sec. Graph 807 shows the temperature at the thermocouple verses the time during the laser cutting process with a beam power of 500 Watts and a beam speed of 30 mm/sec. The results from each of the graphs show the modeling technique closely matches the values of the experimental technique.

The foregoing merely illustrates the principles of the invention. It will thus be appreciated that those skilled in the art will be able to devise numerous systems, apparatus and methods which, although not explicitly shown or described herein, embody the principles of the invention and are thus within the spirit and scope of the invention as defined by its claims.

We claim:

1. A method for improving the quality of a cut made in workpiece during a laser beam cutting process, comprising the steps of:

generating a model of the temperatures of a plurality of modes on said workpiece, wherein said nodes indicate relative positions on said workpiece;

generating a laser power data profile for said cutting process responsive to said node's modeled temperature; and varying said laser beam's power responsive to said power data profile.

2. The method of claim 1, wherein said modeling step is responsive to the presence of a kerf in said workpiece.

3. The method of claim 1, wherein said laser power data profile is indicative of said laser's beam's power over said cut's length optimized to stabilize said node's cutting front temperature.

4. The method of claim 1, wherein said varying step is performed after said laser power data profile is completed.

5. The method of claim 1, further including the step of stabilizing said node's cutting front temperature by comparing each of said node's temperature in said cut to a previous node at a different time period.

6. The method of claim 5, wherein said stabilizing step changes a node's temperature if said comparison exceeds a selected value.

7. The method of claim 6, where said stabilization step changes the power of the laser beam to change a node's temperature.

8. The method of claim 1, wherein said laser beam cutting process includes cutting said workpiece near a boundary of said workpiece.

9. The method of claim 1, wherein said laser beam cutting process includes cutting a corner in said workpiece.

10. The method of claim 1, wherein said laser beam cutting process includes cutting a small diameter hole in said workpiece.

11. A system for performing a laser cutting operation on a workpiece, comprising:

a laser with a controllable beam to cut said workpiece;

a processing unit for modeling said workpiece's temperature for said laser cutting operation and for providing a laser power data profile for stabilizing said workpiece's cutting front temperature; and a controller for changing said laser beam's power responsive to said power data profile.

12. The system of claim 11, further including a data input unit to accept input data and transfer said data to said processing unit.

13. The system of claim 11, wherein said controller is operated after said laser data profile is completed.

14. The system of claim 11, wherein said processing unit stabilizes said cutting front temperature by reducing cutting front temperature differentials between adjacent points in a cut path on said workpiece.

15. A method for improving the quality of a cut made in a workpiece during a laser beam cutting operation, wherein a plurality of nodes indicate relative positions on said workpiece, comprising the steps of:

a. comparing a temperature associated with a first and second adjacent said node along said cut;
  b. incrementally increasing said laser's power if said first node's temperature is less than said second node's temperature by a selected amount;
  c. incrementally decreasing said laser's power if said first node's temperature is greater than said second nodes temperature by said selected amount; and
  d. repeating steps a through c until each of said adjacent nodes in said cut are compared.

16. The method of claim 15, wherein said temperature associated with said first and second nodes is a cutting front temperature.

17. The method of claim 15, wherein said selected amount is responsive to said laser's beam power.

18. The method of claim 15, wherein said selected amount is further responsive to said first and second node's temperature differential.

19. The method of claim 15, further including the step of producing a power profile indicative of said laser's beam's optimized power for said cut.

20. The method of claim 15, wherein said adjacent nodes in said cut are compared at different time increments during said cut operation.

21. An apparatus for improving the quality of a cut made in a workpiece during a laser beam cutting operation comprising:

means for generating a model of such workpiece's cutting front temperature for said laser cutting operation;
  means for stabilizing said workpiece's modeled cutting front temperature; and
  means for providing a laser power data profile responsive to said stabilized modeled cutting front temperature.

22. The apparatus of claim 21, wherein said means for stabilizing said surface temperature reduces temperature differentials between adjacent points along said cut on said workpiece.

23. The apparatus of claim 21, wherein said apparatus further includes control means for varying said laser beam's power responsive to said power data profile.

24. The apparatus of claim 23, wherein said control means is operated after said laser power data profile is completed.

* * * * *

UNITED STATES PATENT AND TRADEMARK OFFICE
CERTIFICATE OF CORRECTION

PATENT NO. : 5,854,751
DATED : December 29, 1998
INVENTOR(S) : Paul Di Pietro, et al It is certified that error appears in the above-identified patent and that said Letters Patent is hereby corrected as shown below:

Col. 2, line 30, "thermo couples" should read -- thermocouples --. Col. 3, line 19, "on" should read -- in --. Col. 5, line 14, "material" should read -- materials --. Col. 6, line 18, "convention" should read -- convection --; line 31 "two dimensional" should read -- two-dimensional --; line 35, equation (1), "q" should read -- $\dot{q}$ --. . Col. 7, line 6, "because" should read -- because of --; line 10, "occur" should read -- occurs --; line 13, "use" should read -- used --; line 31, "beamed" should read -- beam --; line 42, "level other" should read -- level. Other --; line 44, "Thus" should read -- This --. Col. 9, line 56, "move" should read -- moved --; line 63, "being" should read -- is being --. Col. 13, line 56, "verses" should read -- versus --; line 59, "verses" should read -- versus --; line 62, "verses" should read -- versus --; line 65, "verses" should read -- versus --. Col. 14, line 11, "workpiece" should read -- a workpiece --; line 14, "modes" should read -- nodes --; line 18, "node's" should read -- nodes' --; line 24, "laser's beam's" should read -- laser beam's --. Col. 15, line 9, "nodes" should read -- node's --; line 22, "laser's beam's" should read -- laser beam's --.

Signed and Sealed this

Twenty-fifth Day of April, 2000

Attest:

Q. TODD DICKINSON

*Attesting Officer*  *Director of Patents and Trademarks*